United States Patent
Wang (10) Patent No.: US 11,335,339 B2
(45) Date of Patent: May 17, 2022

(54) VOICE INTERACTION METHOD AND APPARATUS, TERMINAL, SERVER AND READABLE STORAGE MEDIUM

(71) Applicant: Baidu Online Network Technology (Beijing) Co., Ltd, Beijing (CN)

(72) Inventor: Tian Wang, Beijing (CN)

(73) Assignees: Baidu Online Network Technology (Beijing) Co., Ltd., Beijing (CN); Shanghai Xiaodu Technology Co., Ltd., Shanghai (CN)

(*) Notice: Subject to any disclaimer, the term of this patent is extended or adjusted under 35 U.S.C. 154(b) by 101 days.

(21) Appl. No.: 16/052,274

(22) Filed: Aug. 1, 2018

(65) Prior Publication Data

US 2019/0147869 A1    May 16, 2019

(30) Foreign Application Priority Data

Nov. 16, 2017    (CN) .................. 201711138336.4

(51) Int. Cl.
*G10L 15/22* (2006.01)
*G10L 25/51* (2013.01)
*G06F 3/16* (2006.01)

(52) U.S. Cl.
CPC .............. *G10L 15/22* (2013.01); *G06F 3/167* (2013.01); *G10L 25/51* (2013.01); *G10L 2015/223* (2013.01); *G10L 2015/228* (2013.01)

(58) Field of Classification Search
CPC ......... G10L 15/22; G10L 15/00; G10L 15/08; G10L 15/18; G10L 15/1815;
(Continued)

(56) References Cited

U.S. PATENT DOCUMENTS

| | | | |
|---|---|---|---|
| 2005/0238211 A1* | 10/2005 | Du | G06K 9/00026 382/124 |
| 2007/0013967 A1* | 1/2007 | Ebaugh | G06F 16/3331 358/448 |
| 2007/0130124 A1* | 6/2007 | Ramsey | G06Q 30/02 |
| 2017/0186427 A1 | 6/2017 | Wang et al. | |
| 2018/0232435 A1* | 8/2018 | Papangelis | G10L 15/063 |

(Continued)

FOREIGN PATENT DOCUMENTS

| | | |
|---|---|---|
| CN | 105450822 A | 3/2016 |
| CN | 106408253 A | 2/2017 |

(Continued)

OTHER PUBLICATIONS

Office Action issued in connection with corresponding Japanese Patent Application No. 2018-147750.
(Continued)

*Primary Examiner* — Qi Han
(74) *Attorney, Agent, or Firm* — Akerman LLP (57) ABSTRACT

A voice interaction method and apparatus, a terminal, a server, and a readable storage medium are provided. The method includes the following steps: obtaining a user's demand according to the user's voice; determining a pre-stored task template matched with the user's demand; matching the user's demand with a necessary slot in the matched task template; and if the user's demand lacks content of the necessary slot, executing a step of obtaining the content of the necessary slot, to obtain the content of the necessary slot; wherein the task template is a template generated in advance according to information required for activating a task operation through voice, the slot is information in the task template, and the necessary slot is necessary information in the task template for activating the task operation.

12 Claims, 2 Drawing Sheets

(58) Field of Classification Search
CPC ..... G10L 15/183; G10L 15/19; G10L 15/193; G10L 15/26; G10L 15/28; G10L 2015/22; G10L 2015/006; G10L 2015/08; G10L 2015/223; G10L 2015/225; G10L 2015/228; G10L 15/06; G10L 2015/0631–0638; G10L 2015/221–228
USPC ....... 704/251, 231, 243, 244, 255, 257, 270, 704/270.1, 275
See application file for complete search history.

(56) References Cited

U.S. PATENT DOCUMENTS

| | | | | |
|---|---|---|---|---|
| 2018/0233141 | A1* | 8/2018 | Solomon | G06K 9/00 |
| 2018/0233143 | A1* | 8/2018 | Papangelis | G06F 16/3329 |

FOREIGN PATENT DOCUMENTS

| | | | |
|---|---|---|---|
| CN | 106782537 A | 5/2017 | |
| CN | 107274897 A | 10/2017 | |
| JP | 2005301017 A | 10/2006 | |
| JP | 2016192020 A | 11/2016 | |
| JP | 2016212135 A | 12/2016 | |

OTHER PUBLICATIONS

Office Action issued in connection with corresponding Chinese Patent Application No. 201711138336.4.
Search Report issued in connection with corresponding Chinese Patent Application No. 201711138336.4.

* cited by examiner

VOICE INTERACTION METHOD AND APPARATUS, TERMINAL, SERVER AND READABLE STORAGE MEDIUM

CROSS-REFERENCE TO RELATED APPLICATION

This application claims priority to Chinese Patent Application No. 201711138336.4, filed on Nov. 16, 2017, the contents of which is hereby incorporated by reference in its entirety.

FIELD OF THE DISCLOSURE

The present disclosure relates to the technical field of voice interaction, and particularly to a voice interaction method and apparatus, a terminal, a server, and a readable storage medium.

BACKGROUND OF THE DISCLOSURE

As far as a conventional voice interaction system is concerned, a speed of activating a task operation through voice is slower, and a user's experience under a voice interaction scenario is not desirable enough, i.e. the technical problem of poor user's experience exists in the conventional voice interaction system.

SUMMARY OF THE DISCLOSURE

Embodiments of the present disclosure provide a voice interaction method and apparatus, a terminal, a server, and a readable storage medium, to solve the at least one of above technical problems in the prior art.

In a first aspect, embodiments of the present disclosure provide a voice interaction method, including the following steps:

obtaining a user's demand according to the user's voice;

determining a pre-stored task template matched with the user's demand;

matching the user's demand with a necessary slot in the matched task template; and if the user's demand lacks content of the necessary slot, executing a step of obtaining the content of the necessary slot, to obtain the content of the necessary slot;

wherein the task template is a template in advance generated according to information required for activating a task operation through voice, the slot is information in the task template, and the necessary slot is necessary information in the task template for activating the task operation.

In a second aspect, embodiments of the present disclosure provide a voice interaction apparatus, including:

a storage module configured to store task templates;

an obtaining module configured to obtain a user's demand according to the user's voice;

a matching module configured to determine a pre-stored task template matched with the user's demand, and further configured to match the user's demand with a necessary slot in the matched task template; and a control module configured to obtain the content of the necessary slot if the user's demand lacks content of the necessary slot;

wherein the task template is a template generated in advance according to information required for activating a task operation through voice, the slot is information in the task template, and the necessary slot is necessary information in the task template for activating the task operation.

In a third aspect, embodiments of the present disclosure provide a terminal, including:

one or more processors, a storage device for storing one or more programs, the one or more programs, when executed by said one or more processors, enable said one or more processors to implement the method according to the first aspect.

In a fourth aspect, embodiments of the present disclosure provide a server, including:

one or more processors, a storage device for storing one or more programs, and task templates;

the one or more programs, when executed by said one or more processors, enable said one or more processors to implement the method according to the first aspect.

In a fifth aspect, embodiments of the present disclosure provide a computer readable storage medium in which a computer program is stored, wherein the computer program, when executed by a processor, implements the method according to the first aspect.

A technical solution among the above technical solutions has the following advantages or advantageous effects: when the user's demand lacks the content of necessary slot, the step of obtaining the content of the necessary slot is executed to obtain the content of the necessary slot; it is feasible to only obtain the content of the necessary slot. Activating the task operation through voice needs less information, the speed of activating the task operation through voice is faster, and the user's experience under the voice interaction scenario is improved.

Another technical solution among the above technical solutions has the following advantages or advantageous effects: the control module of the voice interaction apparatus is used to, when the user's demand lacks the content of necessary slot, obtain the content of the necessary slot; it is feasible to only obtain the content of the necessary slot. Activating the task operation through voice needs less information, the speed of activating the task operation through voice is faster, and the user's experience under the voice interaction scenario is improved.

The above summary is only intended for description purpose, not to limit in any manner. In addition to illustrative aspects, implementation modes and features described above, further aspects, implementation modes and features of the present disclosure will be made apparent by referring to drawings and the following detailed depictions.

BRIEF DESCRIPTION OF DRAWINGS

In the figures, unless otherwise specified, reference numbers throughout a plurality of figures represent the same or similar components or elements. These figures are not certainly drawn by scale. It should be appreciated that these figures only depict some embodiments according to the present disclosure, and should not be considered as limiting the scope of the present disclosure.

LISTING OF REFERENCE NUMBERS

110 storage module, 120 obtaining module, 130 matching module, 140 control module;

210 a processor of a terminal, 220 a storage device of the terminal;

310 a processor of a server, 320 a storage device of the server.

DETAILED DESCRIPTION OF PREFERRED EMBODIMENTS

The following text only simply describes some exemplary embodiments. As recognized by those skilled in the art, it is possible to modify the described embodiments in various manners without departing from the spirit or scope of the present disclosure. Hence, the figures and depictions are considered as being substantially exemplary not restrictive.

Embodiment 1

Figure 1:
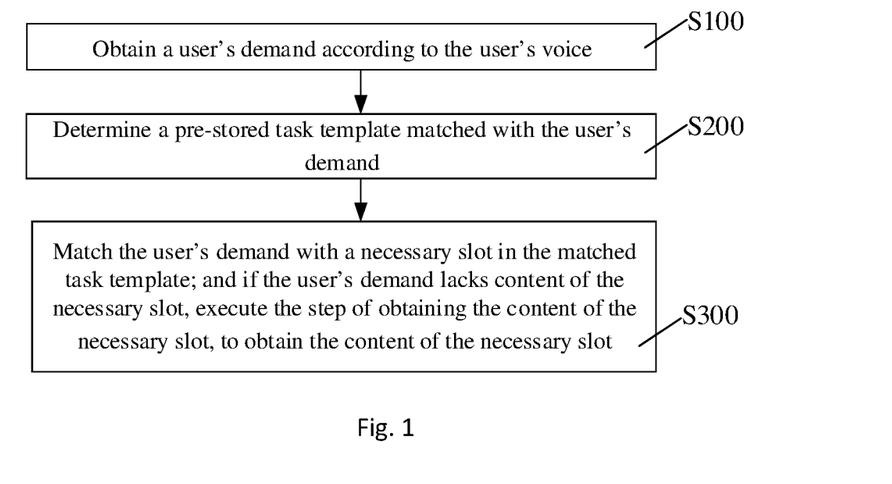
FIG. 1 is a flow chart of a voice interaction method according to Embodiment 1 of the present disclosure.

The present embodiment of the present disclosure provides a voice interaction method. As shown in FIG. 1, the method includes steps S100-S300.

Step S100, a user's demand is obtained according to the user's voice.

In an example of the embodiment of the present disclosure, the user's voice is obtained by a terminal that may obtain the user's voice data, wherein the terminal includes but is not limited to devices such as a smart mobile phone, a tablet computer, and a smart robot, etc.; it is possible to use many types of voice recognition technologies to parse the user's voice to thereby obtain the user's demand; as an optional manner, it is possible to upload the user's voice to a server for parsing, and obtain the user's demand according to the parsed result. It is possible to process originally-obtained user's voice data to reduce the size of data uploaded to the server.

Step S200, a pre-stored task template matched with the user's demand is determined.

Step S300, the user's demand is matched with a necessary slot in the matched task template; and if the user's demand lacks content of the necessary slot, a step of obtaining the content of the necessary slot is executed;

wherein the task template is a template generated in advance according to information required for activating a task operation through voice, the slot is information in the task template, and the necessary slot is necessary information in the task template for activating the task operation.

The pre-stored task template may be pre-stored on the server. Each task template corresponds to a logically independent and un-subdivisible task operation. When voice activates a certain task template, the task operation corresponding to the task template is activated. For example, a task operation for an alarm clock as an operation object includes four types of logically independent and un-subdivisible task operations as listed in the following table:

| A task operation for an alarm clock as an operation object | A task operation of creating the alarm clock | A task operation of deleting the alarm clock | A task operation of querying for the alarm clock | A task operation of modifying the alarm clock |
|---|---|---|---|---|
| A corresponding task template | A task template for creating the alarm clock | A task template for deleting the alarm clock | A task template for querying for the alarm clock | A task template for modifying the alarm clock |

Take the task template of creating the alarm clock as an example. In the task template of creating the alarm clock, necessary slots and content of necessary slots, and unnecessary slots and content of unnecessary slots are shown in the table below:

| Slot name | Necessity | Content of slot |
|---|---|---|
| Date | Necessary slot | Tomorrow |
| Time | Necessary slot | 7:00 am |
| Repetition period | Unnecessary slot | Working day |
| Reminding manner | Unnecessary slot | Bell ring |

For example, if the user's voice is "set the alarm clock", the obtained user's demand is to create the alarm clock;

all pre-stored task templates matched with the user's demand, namely, task templates for creating the alarm clock, are determined;

the user's demand for creating the alarm clock is matched with necessary slots "date" and "time" of a matched task template for creating the alarm clock;

At this time, the user's demand for creating the alarm clock does not have content of necessary slots "date" and "time" in the task template for creating the alarm clock, and it is necessary to perform a step of obtaining content of the necessary slots; namely, generating interaction data for obtaining "date" and "time" according to a preset guidance rule, and providing the interaction data to the user to obtain the content of "date" and "time", tomorrow and 7:00 am.

According to the voice interaction method of the above technical solution according to the embodiment of the present disclosure, when the user's demand lacks content of necessary slots, a step of obtaining the content of necessary slots is executed to obtain the content of necessary slots. It will suffice to only obtain the content of the necessary slots. Less information is required for activating a task operation through voice, the speed of activating the task operation through voice is higher, and the user's experience under the voice interaction scenario is improved.

The above depictions of the embodiment of the present disclosure involve a processing manner for the case in which the user's demand lacks content of necessary slots. Hereunder, description will be presented for the case in which the user's demand includes content of all necessary slots.

If the user's demand includes content of all necessary slots, activate the task operation corresponding to the task template;

wherein each task template corresponds to one task operation.

In the technical solution having the above technical features, when the user's demand includes content of all necessary slots, the task operation corresponding to the task template is activated, the speed of activating the task operation through voice is higher, and the user's experience under the voice interaction scenario is improved.

Within a preset time period after completion of activation of the task operation of this time, if the user's demand is to change the task operation of this time, the method further includes the following step:

confirming the changing operation with the user, and changing the task operation after the user confirms.

Take canceling the alarm clock after successfully creating the alarm clock as an example:

Q: successfully create the alarm clock, and will remind you to get up at 8:00 am tomorrow A: cancel it.

Q: can you confirm cancelling the alarm clock of reminding you to get up at 8:00 am tomorrow?

A: confirm.

Q: the alarm clock is already deleted.

Regarding unnecessary slots, after the user expresses content of unnecessary slots, according to the above technical solution of the embodiment of the present disclosure, content of unnecessary slots will be recognized to enable the activated task operation to be more responsive to the user's refined personalized demand. However, when the user does not express content of unnecessary slots, the task operation corresponding to the task template is activated so long as the user's expression includes content of all necessary slots.

It is a very important thing that the voice interaction scenario enhances the user's experience. Regarding the user's demands, the user's experience can be effectively enhanced by enriching the user's expressions. To ensure authenticity of the user's expression, it is optimal to use the user's online log for enrichment. If there is no online log, multiple persons are allowed to participate in enrichment of the user's expressions in a "crowdsourcing" manner, to ensure diversity of expression forms.

Ideally, enrichment sets are classified into two types: one is a set of simulating real user's demands, and called "a real set"; the other is a set in which product policies are to be satisfied subsequently, and called "a difficulty set". The "real set" is used to evaluate real effects, and the "difficulty set" is used to guide the direction of policy optimization.

After the user's expressions are enriched, any object in the enrichment set can match with the user's demand. For example, if the user's demand is to create the alarm clock, the enrichment set of the user's expressions includes "set the alarm clock", "build the alarm clock", "create the alarm clock", "alarm clock" and so on. When the user expresses anyone in the enrichment set through voice, the obtained user's demand is to create the alarm clock.

Embodiment 2

Embodiment 2 of the present disclosure is based on Embodiment 1 of the present disclosure. The content of necessary slots absent in the user's demand is specifically the content of the first-class necessary slots.

Figure 2:
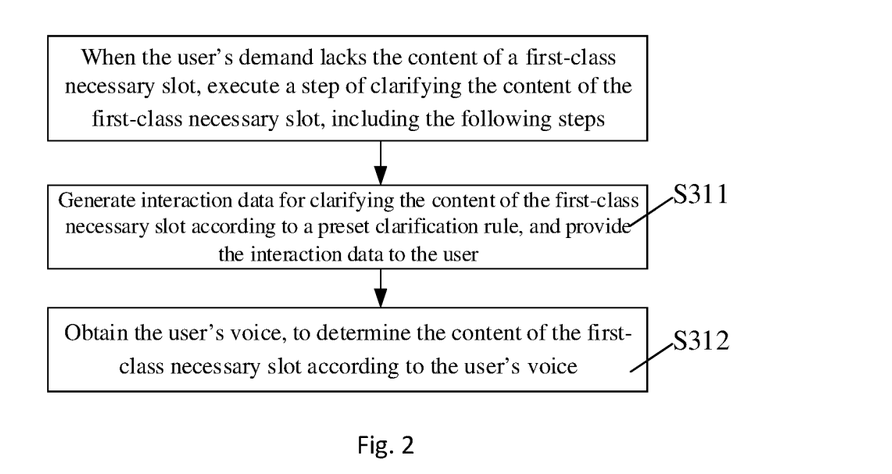
FIG. 2 is a flow chart of obtaining content of a first-class necessary slot in a voice interaction method according to Embodiment 2 of the present disclosure.

In this case, as shown in FIG. 2, the step of obtaining the content of necessary slots specifically includes the following steps:

When the user's demand lacks the content of the first-class necessary slots, a step of clarifying the content of the first-class necessary slots is executed, the step including the following steps:

Step S311, generating interaction data for clarifying the content of the first-class necessary slots according to a preset clarification rule, and providing the interaction data to the user;

Step S312, obtaining the user's voice to determine the content of the first-class necessary slots according to the user's voice;

wherein the content of the first-class necessary slots is content of necessary slots that must be provided by the user.

When the user's demand lacks the content of the first-class necessary slots, namely, the user's demand lacks the content of necessary slots that must be provided by the user, e.g., content regarding date and time in the task template for creating the alarm clock, it is feasible to generate the interaction data for clarifying content of the first-class necessary slots according to the preset classification rule; provide the interaction data to the user and obtain the user's voice to determine the content of the first-class necessary slots according to the user's voice. As such, it is possible to very quickly and conveniently obtain more sound and definite meaning expression, facilitate quickening the speed of activating the task operation through the voice, and improve the user's experience under the voice interaction scenario.

In the case that the user's demand lacks the content of the first-class necessary slots, it might lack content of one first-class necessary slot, or content of a plurality of first-class necessary slots. When the user's demand lacks the content of one first-class necessary slot, the problem can be solved by directly employing the above technical solution in Embodiment 2 of the present disclosure.

When the user's demand lacks content of a plurality of first-class necessary slots, as stated below it is necessary to obtain the content of the plurality of first-class necessary slots one by one, and set a certain order:

executing the step of classifying the content of first-class necessary slots with respect to each of the first-class necessary slots whose content is absent, in the preset order.

The preset order may be an order arranged according to priorities of the plurality of first-class necessary slots, for example, may be obtained according to a descending order of priorities, namely, firstly ask for content of the first-class necessary slots with higher priorities, and then ask for content of the first-class necessary slots with lower priorities.

During execution of the step of clarifying the content of the first-class necessary slots, what decides a classification efficiency is a clarification rule.

Executing the step of classifying the content of each of first-class necessary slots might need multiple rounds of interaction with the user. In the multiple rounds of interaction, a reasonable exit policy is needed. Exit is performed when different situations for exit appear.

First, there are situations of passive exit. For example, during execution of the step of classifying the content of a first-class necessary slot, if the number of times the user's input cannot match the slot reaches the preset number of times, or the user's voice is not obtained within a preset time period, activation of the task operation is exited.

For example, during activation of the task operation of creating the alarm clock, if the number of times the user's input cannot match the slot reaches twice, or the user's voice is not obtained within a preset time period of 40 seconds, activation of the task operation of creating the alarm clock is exited.

Secondly, there are situations of active exist. If the user's demand is changed to cancel the task operation, it is feasible to send a confirmation request to the user, and execute the cancellation of the task operation after the user confirms the cancellation of the task operation;

Or if the user's demand is changed to activate another task operation, activate another task operation after modification.

In addition, executing the step of classifying the content of each of first-class necessary slots might need multiple rounds of interaction with the user. In the multiple rounds of interaction, the user may meet some situations other than passive exit and active exit, and it is necessary to handle common situations out of these other situation.

During execution of the step of classifying the content of the first-class necessary slots, if the user's demand is to modify the already-clarified content of the first-class necessary slots, modification is made after the user's confirmation;

or if the user's demand is changed to cancel the task operation, the activation of the task operation is cancelled after the user's confirmation.

By handling common situations in the multiple rounds of voice interaction, it is possible to obtain more real meaning expression, facilitate quickening the speed of activating the task operation through voice, and improve the user's experience under the voice interaction scenario.

Specific examples are presented below for making modification after the user's confirmation if the user's demand is to modify the already-clarified content of the first-class necessary slot:

A: I want to order an executive room of Crystal Orange Hotel (Chongwenmen branch), stay 3 nights
Q: When will you check in?
A: March 18
Q: Crystal Orange Hotel (Chongwenmen branch), one executive room, check in on March 18, stay 3 nights, please confirm?
A: check in on March 19
Q: the check-in time is changed to March 19, please confirm?
A: confirm.

When the user's demand is to query for the already-clarified content of the first-class necessary slots, the user is informed of the already-clarified content of the first-class necessary slot. A specific example is presented below:

. . .
Q: What do you want to eat?
A: Spicy chicken filet burger, one set meal
. . .
Q: How do you want to pay?
A: How many spicy chicken filet burger set meals have I just ordered?
Q: Spicy chicken filet burger, one set meal
Q: How do you want to pay?
. . .

When the user's demand is to change to activate another task operation, the task operation is activated after modification. A specific example is presented below:
Q: Help me create an alarm clock
A: What time do you want to be woken up?
Q: What about tomorrow's weather?
A: [Broadcast tomorrow's weather forecast]

Embodiment 3

Embodiment 3 of the present disclosure is based on Embodiment 1 of the present disclosure. The content of necessary slots absent in the user's demand is specifically the content of the second-class necessary slots.

In this case, the step of obtaining the content of necessary slots specifically includes the following steps:

when the user's demand lacks the content of the second-class necessary slots, acquiring the content of the second-class necessary slots locally from a user-used terminal, for example, a default value of the user-used terminal, a current state and the like;

wherein the content of the second-class necessary slots is content of necessary slots that can be locally acquired from the user-used terminal.

Take a task template of querying for weather as an example. In the task template of querying for weather, necessary slots including location and time are second-class necessary slots. The second necessary slots are filled by obtaining a current location and a current time of the user-used terminal, i.e., the current location and the current time of the user-used terminal are regarded as content of the second-class necessary slots.

Acquiring the content of necessary slots locally from the user-used terminal each time does not always succeed. Therefore, if the acquiring the content of necessary slots locally from the user-used terminal fails, the following steps are included:

generating interaction data for clarifying the content of the second-class necessary slots according to a preset clarification rule, and providing the interaction data to the user;

obtaining the user's voice, to determine the content of the second-class necessary slots according to the user's voice.

When the user's demand lacks the content of the second-class necessary slots, first the content of the necessary slots is locally acquired from the user-used terminal; then, if acquiring the content of necessary slots locally from the user-used terminal fails, it is feasible to generate the interaction data for clarifying content of the second-class necessary slots according to the preset classification policy, and provide the interaction data to the user; obtain the user's voice to determine the content of the second-class necessary slots according to the user's voice. As such, it is possible to reduce interaction with the user to a certain degree, and meanwhile very quickly and conveniently obtain more sound and definite meaning expression, facilitate quickening the speed of activating the task operation through the voice, and improve the user's experience under the voice interaction scenario.

Likewise, during execution of the step of clarifying the content of the second-class necessary slots, what decides classification efficiency is the clarification rule. The classification rule is a classification rule formulated based on the slot type. The same slot type employs the same classification rule. Take a task template of ordering an airplane ticket as an example:

| Slot name | Necessity | Slot content | Slot type |
| --- | --- | --- | --- |
| Departure | Necessary slot | Beijing | City |
| Destination | Necessary slot | Shanghai | City |
| Takeoff time | Necessary slot | Tomorrow | Time |
| . . . | . . . | . . . | . . . |

It can be seen that two different slots, i.e., the departure and destination, both belong to the same slot type, namely, city. As such, the classification rule is a classification rule formulated based on the slot type. The same slot type employs the same classification rule.

Take creating a "query time" for reminding as an example:

[ Confirmation needed] time is ambiguous (an accurate time cannot be designated completely without ambiguity), and confirmation is needed;

a. The user only expresses a time (without date) within a range of 1-11 o'clock. There are two time meeting the condition within 24 hours, specific time cannot be determined, and it is necessary to provide the user with at least two time points for query (e.g., Q: "let me take the medicine at 8 o'clock"; A: "do you mean 8:00 pm tonight or 8:00 am tomorrow morning?")

b. The user expresses date (X month X day, which day of the week, tomorrow)+time. There are two time meeting the conditions within 24 hours on this day, the relationship between the event and time cannot be accurately recognized, the specific time cannot be determined, and it is necessary to provide the user with two time points for query (e.g., Q: "let me take the medicine at 8 o'clock on December 31"; A: "do you mean 8:00 am on December 31 or 8:00 pm on December 31?")

c. If the user expresses "wake me up at X o'clock tomorrow morning", and if the current time is 3:00-6:00 am and the wake-up time is near the current time, let the user confirm that he means this morning or tomorrow morning (e.g., Q: "wake me up at 8:00 am tomorrow morning"; A: "It's already early in the morning. Do you mean 8:00 am tomorrow or 8:00 am this morning?").

d. If the user-expressed date is ambiguous (e.g., Monday of the third week of December), it is necessary to provide the user with at least two time points for query (e.g., Q: "Wake me up at 8:00 am on Monday of the third week of December"; A: Do you mean X o'clock of the morning of X month X day, or Y o'clock of the morning of X month X day?").

When the content of the necessary slots locally acquired from the user-used terminal is regarded as the lacked content of second-class necessary slots, there might appear a case that sometimes the user's demand is not the user's real demand Hence, it is necessary to provide a convenient modification manner for this case.

During activation of the task operation or within a preset time period after completion of the activation of the task operation, if the user's demand is to modify content of any one of the second-class necessary slots, activate the task operation corresponding to the task template after modification;

wherein each of said task templates corresponds to one of said task operations.

Still take the task template for querying for weather forecast as an example. In the task template for querying for weather forecast, within a preset time after performing weather forecast by taking the current location "Beijing" of the user-used terminal and the current time "9:00 am" as the content of the second-class necessary slots, the user's voice indicates Shanghai, i.e., the user's demand is to modify location as the content of the second-class necessary slot, activate the task operation of performing weather forecast by taking "Shanghai" as the location after modification and the current time as time.

During activation of the task operation or within a preset time period after completion of activation of the task operation, the user may modify the content of the second necessary slot through voice, and activate the task operation corresponding to the task template after modification. This may modify the task template as quickly as possible to activate the task operation meeting the user's real demand, quickly and conveniently obtain more sound and definite meaning expression, facilitate quickening the speed of activating the task operation through the voice, and improve the user's experience under the voice interaction scenario.

Embodiment 4

Embodiment 4 of the present disclosure is a combination of Embodiment 2 and Embodiment 3 of the present disclosure and will not be described in detailed any more.

Embodiment 5

Embodiments 1-4 of the present disclosure all relate to a technical solution in which the user's dialog is a task-type dialog in the voice interaction method. The task-type dialog is a dialog assisting the user in completing a specific task; the user's dialog further includes open dialog. The open dialog refers to a question-answer dialog without a specific subject matter. The open dialog includes portrait dialog, chat dialog, and catch-all dialogue.

On the basis of Embodiment 1 to Embodiment 4, Embodiment 5 of the present disclosure further includes a technical solution with respect to the open dialog.

For example, the technical solution with respect to the portrait dialog further includes the following steps:

matching the user's demand with pre-stored portrait templates;

if the user's demand is successfully matched with a corresponding portrait template, matching the user's demand with information of the corresponding portrait template;

if the user's demand is successfully matched with the information of the corresponding portrait template, informing the information of the corresponding portrait template;

wherein the portrait template is generated according to information of a portrait object.

The portrait dialog includes the user's own portrait dialog and a portrait dialog of a voice interaction system for executing the voice interaction method. The two classes of dialogs have different targets. The target of the user's own portrait dialog is mining the user's information, recording user portrait-related key information, and providing personalized user portrait service on this basis; the target of the dialog of the voice interaction system is telling the user information about the terminal, establishing an anthropomorphic image, and increasing confidence with the user.

The user's own portrait performs processing for key user information such as the user's name. Where the user expresses these information of his own, the voice interaction system may record information corresponding to the user, and finally feed the information back to the user when the user asks a question such as whether to remember his own name.

The portraits of the voice interaction system cover all information of the voice interaction system and cover high-frequency personalization information. The portraits of the system all are provided with purposeful question-answer scripts which mainly exist in one-question-multiple answer form. When the user asks a specific question, an answer is selected from multiple answers and returned to the user. Meanwhile, with respect to the question, the portraits of the system also perform generalization to a certain degree to ensure recall of sufficient user expressions.

For example, the technical solution with respect to the chat dialog further includes the following steps:

matching the user's demand with pre-stored chat templates;

if the user's demand is successfully matched with a corresponding chat template, matching the user's demand with information of the corresponding chat template;

if the user's demand is successfully matched with the information of the corresponding chat template, informing the user the information of the corresponding chat template;

wherein the chat template is generated according to information of a preset chat subject matter.

Due to technical limitations of semantic understanding capability, it is currently impossible to perform open smooth chat on the basis of understanding the user's expression. The current chat template performs search for match of the user's expression and a query in semantics based on a lot of question-answer corpus, thereby presenting an answer. As can be seen from the above, it is impossible to ensure constant chat with the user logically consistently in this manner. The user usually feels that it is feasible to chat a little, and that a case that the answer is irrelevant to the question will appear in the case of much chat.

Therefore, chat content is only provided to a specific query, and the user is not allowed to constantly chat during chat. To this end, replies to chat corresponding to a small amount of specific queries are drafted according to product roles, to ensure that content of each answer conforms to orientation of a product role.

The technical solution with respect to catch-all dialog is as follows:

The catch-all dialog is a catch-all reply to the user when no service may meet the user's demand. The catch-all dialog here includes basic answer content and guidance content. The answer content notifies the user that the user's demand cannot be met. The guidance content guides the user to perform the next operate.

If the user's demand obtained from the user's voice cannot match with all pre-stored task templates, portrait templates and chat templates, the catch-all reply informs the user that the user's intention is not quite understood, thereby improving robustness of the voice interaction method.

If exception occurs in activation of the task operation, portrait operation and chat operation and service cannot be provided, the catch-all reply replies according to a preset catch-all logic.

Q: What about today's weather?

A: [Exceptions occurs in Service] The weather forecast service is abnormal, and will recover very soon. You may ask me again after a while.

In expressions such as the above, first a current state is expressed, and then the user is informed of how to operate. The catch-all dialog is essential, and is an indispensable portion in the smart voice interaction method.

Embodiment 6

Figure 3:
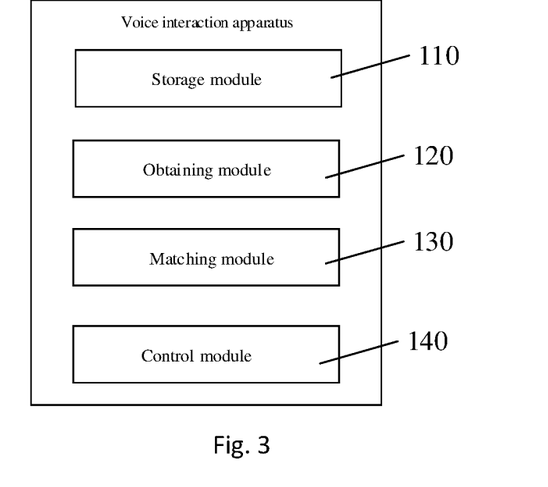
FIG. 3 is a schematic diagram of a voice interaction apparatus according to Embodiment 6 of the present disclosure.

Embodiment 6 of the present disclosure provides a voice interaction apparatus. As shown in FIG. 3, the voice interaction apparatus includes:

a storage module 110 configured to store task templates;

an obtaining module 120 configured to obtain the user's demand according to the user's voice;

a matching module 130 configured to determine a pre-stored task template matched with the user's demand, and further configured to match the user's demand with a necessary slot in the matched task template; and a control module 140 configured to obtain the content of the necessary slot if the user's demand lacks content of the necessary slot;

wherein the task template is a template generated in advance according to information required for activating a task operation through voice, the slot is information in the task template, and the necessary slot is necessary information in the task template for activating the task operation.

The control module of the voice interaction apparatus of the technical solution of the embodiment of the present disclosure is configured to, when the user's demand lacks the content of necessary slot, obtain the content of the necessary slot; it is feasible to only obtain the content of the necessary slot. The voice interaction apparatus of the technical solution of the embodiment of the present disclosure needs less information in activating the task operation through voice, the speed of activating the task operation through speed is faster, and the user's experience under the voice interaction scenario is improved.

The above depictions of the embodiment of the present disclosure involve a processing manner for the case in which the user's demand lacks content of necessary slots. Hereunder, description will be presented for the case in which the user's demand includes content of all necessary slots.

The control module is further configured to activate the task operation corresponding to the task template when the user's demand includes content of all necessary slots, wherein each task template corresponds to one task operation.

In the technical solution having the above technical features, when the user's demand includes content of all necessary slots, the control module activates the task operation corresponding to the task template, the speed of activating the task operation through voice is faster, and the user's experience under the voice interaction scenario is improved.

Regarding content of unnecessary slots, after the user expresses the content, the above technical solution of the embodiment of the present disclosure will recognize the content to enable the activated task operation to be more responsive to the user's refined personalized demand. However, when the user does not express the content, the task operation corresponding to the task template is activated so long as the user's expression includes content of all necessary slots.

Embodiment 7

Embodiment 7 of the present disclosure is based on Embodiment 6 of the present disclosure. The content of necessary slots absent in the user's demand is specifically the content of the first-class necessary slots.

In this case, the control module is further configured to, when the user's demand lacks the content of the first-class necessary slots, clarify the content of the first-class necessary slots, clarifying the content of the first-class necessary slots is configured for:

generating interaction data for clarifying the content of the first-class necessary slots according to a preset clarification rule, and providing the interaction data to the user;

obtaining the user's voice through the obtaining module to determine the content of the first-class necessary slots according to the user's voice;

wherein the content of the first-class necessary slots is content of necessary slots that must be provided by the user.

As such, it is possible to obtain the content of the first-class necessary slots, very quickly and conveniently obtain more sound and definite meaning expression, facilitate quickening the speed of activating the task operation through the voice, and improve the user's experience under the voice interaction scenario.

In the case that the user's demand lacks the content of the first-class necessary slots, it might lack content of one first-class necessary slot, or content of a plurality of first-class necessary slots. When the user's demand lacks the content of one first-class necessary slot, the problem can be solved by directly employing the above technical solution in Embodiment 7 of the present disclosure.

When the user's demand lacks content of a plurality of first-class necessary slots, as stated below it is necessary to obtain the content of the plurality of first-class necessary slots one by one, and set a certain order:

the control module is further configured to classify the content of first-class necessary slots with respect to each of the first-class necessary slots whose content is absent, in the preset order.

The preset order may be an order arranged according to priorities of the plurality of first-class necessary slots, for example may be determined according to a descending order of priorities, namely, firstly ask for content of the first-class necessary slots with higher priorities, and then ask for content of the first-class necessary slots with lower priorities.

As for clarifying the content of the first-class necessary slots, what decides a classification efficiency is a clarification rule.

Classifying the content of each of first-class necessary slots might need multiple rounds of interaction with the user. In the multiple rounds of interaction, a reasonable exit policy is needed. Exit is performed when different situations for exit appear.

First, there are situations of passive exit. For example, the control module is configured to exit activation of the task operation when classifying the content of a first-class necessary slot, if the number of times the user's input cannot match the slot reaches a preset number of times, or the user's voice is not obtained within a preset time period.

In addition, classifying the content of each of first-class necessary slots might need multiple rounds of interaction with the user. In the multiple rounds of interaction, the user might meet other situations other than passive exit and active exit, and it is necessary to handle some common situations among these other situations.

As for classifying the content of the first-class necessary slots, the control module is further configured to, when the user's demand is to modify the already-clarified content of the first-class necessary slot, make modification after the user's confirmation;

or the control module is further configured to, if the user's demand is changed to cancel the task operation, send a confirmation request to the user, and perform the cancellation of the task operation after the user confirms the cancellation of the task operation.

By handling common situations in the multiple rounds of interaction, it is possible to obtain more real meaning expression, facilitate quickening the speed of activating the task operation through the voice, and improve the user's experience under the voice interaction scenario.

Embodiment 8

Embodiment 8 of the present disclosure is based on Embodiment 6 of the present disclosure. The content of necessary slots absent in the user's demand is specifically the content of the second-class necessary slots.

In this case, the control module is further configured to, when the user's demand lacks the content of the second-class necessary slots, acquire the content of the second-class necessary slots locally from a user-used terminal, for example, a default value of the user-used terminal, a current state and the like;

wherein the content of the second-class necessary slots is content of necessary slots that can be locally acquired from the user-used terminal.

Acquiring the content of necessary slots locally from the user-used terminal each time does not always succeed. Therefore, the control module is further configured to, if the acquiring the content of necessary slots locally from the user-used terminal fails, generate, according to a preset clarification policy, interaction data for clarifying the content of the second-class necessary slots, and provide the interaction data to the user; obtain the user's voice, to determine the content of the second-class necessary slots according to the user's voice.

The above technical solution of the embodiment of the present disclosure may reduce interaction with the user to a certain degree, and meanwhile very quickly and conveniently obtain more sound and definite meaning expression, facilitate quickening the speed of activating the task operation through the voice, and improve the user's experience under the voice interaction scenario.

When the content of the necessary slots locally acquired from the user-used terminal, such as the default value of the user-used terminal or the current state, is regarded as the lacked content of second-class necessary slots, there might appear a case that sometimes the user's real demand cannot be met. Hence, it is necessary to provide a convenient modification manner for this case.

The control module is further configured to, during activation of the task operation or within a preset time period after completion the activation of the task operation, if the user's demand is to modify content of any one of the second-class necessary slots, activate the task operation corresponding to the task template after modification;

wherein each of said task templates corresponds to one of said task operations.

During activation of the task operation or within a preset time period after completion of the activation of the task operation, the user may modify the content of the second necessary slot through voice, and activate the task operation corresponding to the task template after the modification. This may modify the task template as quickly as possible to execute the task operation meeting the user's real demand, quickly and conveniently obtain more sound and definite meaning expression, facilitate quickening the speed of activating the task operation through the voice, and improve the user's experience under the voice interaction scenario.

Embodiment 9

Embodiment 9 of the present disclosure is a combination of Embodiment 7 and Embodiment 8 of the present disclosure and will not be described in detail any more.

Embodiment 10

Figure 4:
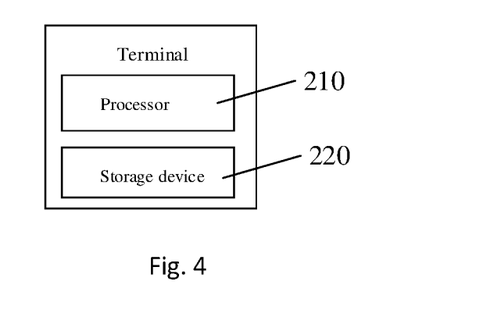
FIG. 4 is a schematic diagram of a terminal according to Embodiment 10 of the present disclosure.

Embodiment 10 of the present disclosure provides a terminal. As shown in FIG. 4, the terminal includes:

one or more processors 210;

a storage device 220 for storing one or more programs, the one or more programs, when executed by said one or more processors, enable the one or more processors to implement the method of any of Embodiment 1 to Embodiment 5 of the present disclosure.

Embodiment 11

Figure 5:
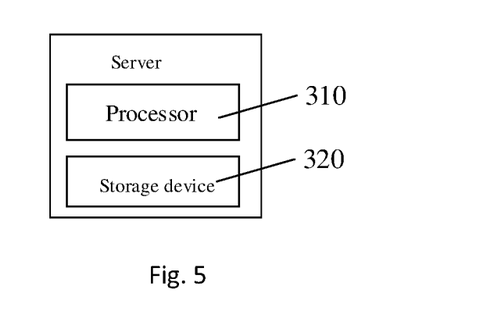
FIG. 5 is a schematic diagram of a server according to Embodiment 11 of the present disclosure.

Embodiment 11 of the present disclosure provides a server. As shown in FIG. 5, the server includes:

one or more processors 310;

a storage device 320 for storing one or more programs, and task templates;

the one or more programs, when executed by the one or more processors, enable the one or more processors to implement the method of any of Embodiment 1 to Embodiment 5 of the present disclosure.

Embodiment 12

The embodiment 12 of the present disclosure provides a computer readable storage medium in which a computer program is stored, wherein the computer program, when executed by a processor, implements the method of any of Embodiment 1 to Embodiment 5 of the present disclosure.

In some embodiments of the present disclosure, the voice interaction needs to interact with the user. Hence, the query for the user is indispensable in the voice interaction. The query for the user needs to be designed to improve the user's experience under the voice interaction scenario, namely, speech design needs to be performed for queries.

The speech design is relatively subjective. First, the product role needs to be defined, and speeches are designed on this basis. Since speeches themselves cannot be exhausted, a method of designing speeches is presented here according to definitions of product roles.

First, the content in a dialog is classified into speech slot and speech. The speech slot refers to basic elements that should be included in the speech. No matter how the speeches are drafted, corresponding elements are needed. For example:

Q: play a song

A: recommend you Chengdu by Zhao Lei

The speech slot herein is {song name} and {singer name}. Other auxiliary content that facilitates complete expression of the sentence, together with the speech slot, forms the speech.

The method is divided into two portions: one is a speech drafting procedure, and the other is speech drafting principles.

1. Speech Drafting Procedure

The speech drafting procedures vary with the task-type dialog and open dialog.

1.1 The speech drafting procedure for the task-type dialog includes: designing a dialog procedure, designing speech elements and drafting the speech.

Designing the dialog procedure

It is possible to draft a dialog procedure often used by the user, in a form similar to a screenplay. The drafting procedure includes a main dialog procedure and further takes into account various accidental branch procedures, to form a complete dialog flowchart.

Designing speech elements

The speech elements refer to information that must be contained in a specific reply. It is necessary to refine, from the dialog procedure, speech elements that must be contained in each reply, for subsequent drafting of speech.

Drafting speeches

As described in the above concepts, the speeches include basic speeches and special speeches. If there are no special demands for the device scenario, general-purpose product main roles are used as drafting principles, to draft the most concise and clear basic speeches. If there are special demands for the device scenario, the special speeches may be drafted according to corresponding product roles.

1.2 The speech drafting procedure for open dialog includes: defining speech principles and drafting speeches.

Defining speech principles

Specific dialog rules are drafted according to defined product role characters. The following setting should be observed upon drafting open dialog rules:

(1) The open dialog is only auxiliary: since the task-type dialog system is developed, the open dialog is introduced only under special scenarios such as catch-all, chat and portrait, and so on. Hence, cautious use of the open dialog only serves as a supplementation in the task-type dialog system;

(2) Not excessively perform the open dialog: since natural language recognition technology has limited capabilities, the open dialog does not make a reply based on the understanding of the user's semantics. Therefore, it is unpreferable to guide the user to perform excessive open dialogs, and each reply should be based on a first principle of not inducing the user to reply.

Drafting speeches

Manners of drafting speeches for catch-all, chat and portrait are not completely the same. Respective principles are described below briefly:

(1) Selecting queries according to policies: rules for selecting queries for drafting speeches for catch-all, chat and portrait are different. The catch-all is based on expression subdivision of the user's intention and is enriched with queries for each class of intention. The chat is enriched with popular queries. The portrait is enriched with queries for portrait answers having content;

(2) Each query needs to be generalized: each query needs to be generalized as much as possible, so it is unnecessary to repeatedly draft answers to the same class of queries;

(3) not less than 3 answers need to be drafted: the same reply cannot repeat forever for each type of query, and it is necessary that at least three different reply speeches appear randomly.

2. Speech Drafting Principles

The principles are divided into overall principles, principles of clarifying speeches and principles of satisfying speeches, whose content are described below respectively:

2.1 Overall Principles

The overall principle includes the following several aspects:

Correct dialog style

A person's speaking style is relatively fixed, and conforms to style setting in a majority of scenarios, but might be different sometimes when the persons talks about a specific topic. For example, a person loving music is more excited when music is mentioned in usual chat. Hence, dialog styles are classified into two types: one is a main style, and the other is a style under a specific scenario. Hence, the first principle is to ensure the correct dialog style and occasionally change the dialog style slightly under a specific scenario.

Principles of a reply in the form of a paragraph

A reply in the form of a large paragraph should be avoided in any dialog. If a large paragraph of words has to be replied, clear logic is the sole rule to be abided by. Replies in paragraphs are classified into the following three cases to ensure clear logic:

| Logic | Definition | Conjunction |
|---|---|---|
| Cause-effect relationship logic | Expression of a relationship having a cause and an effect | because (as or since) |
| Three-segment type logic | Description of three-section type logic having cause, development and a final result | First . . . secondly . . . finally |
| Sequential and parallel logic | multiple items of content with a sequential relationship, or a parallel relationship in logic | Firstly . . . secondly . . . thirdly |

Recommended conjunctions are used to connect contents in the paragraph to ensure a clear paragraph structure.

Word-selecting principles

A. word selection principles:

The most commonly-used words are preferential, the most commonly-used words are selected for expression, for example, "unnecessary" is recommend for use, and "no need" is not recommend for use;

Unambiguous words are selected preferably: words with multiple pronunciations and multiple meanings should be avoided as much as possible, and those unambiguous expressions are selected;

Non-popular words are preferably selected: popular network words are not used. Since they are popular, they will become old-fashioned easily;

Verbs and nouns are mainly selected, and adjectives are used as few as possible. If adjectives are needed, commonly-used adjectives are selected. Onomatopoeia is not selected unless a well-defined onomatopoeia exists in mark-up language of voice synthesis. It must be ensured that the onomatopoeia can well convey the tone in the text-to-voice broadcast.

B. Person-selecting principles

The first person: try to use "I" when calling oneself, not the name itself;

The second person: call the user as "you".

Speech-testing principles

Test needs to be performed upon completion of speech design. The following principles need to be observed upon testing.

Read-feeling test

After a speech designer completes the speech drafting, he/she may find users to conduct dialog rehearsal. They read questions and answers aloud to each other. It is possible to feel whether the speech expressions are natural and smooth during this process.

Test of reading smoothly without any break

When the user is replied with only one sentence, it is ensured that the sentence can be read without any break and without difficulty. If not, the speech needs to be made as concise as possible.

Test of forgetting the preceding text

On principle, regarding each sentence of speech, even though the expression of voice interaction is forgotten, the speaker should still know what he/she should do, and know what question should be answered.

2.2 Principles of Clarifying Speeches

Definition

Clarifying speeches are dialog speeches for clarifying slot information expressed by the user, or confirming the user's intention in dialog interaction. An example is as follows:

Q: Help me set the alarm clock

A: What time do you want to be woken up?

The content of the answer in the above example is a clarifying speech. The clarifying speech is described below in detail.

Basic principles 2.2.1 The sentence pattern of the clarifying speech employs a question, with a definite purpose;

2.2.1.1 Only one slot is asked upon query each time. Only a question whose answer is closed is asked to enable the user to clearly know what he/she should answer;

| Suggested | Not suggested |
|---|---|
| A: Can you tell me which city do you live in? | A: Can you tell me the city where you live and your salary? |

2.2.1.2 Use a question as an ending: a clarifying speech must be a question with "?" at the ending of the sentence. If you have some content to be stated, you may need to state the content to the user first, and use a declarative sentence at the sentence end as an ending:

| Suggested | Not suggested |
|---|---|
| A: I did not understand you. Please repeat. | A: I did not understand you. What time to remind you? |

2.2.1.3 In the case that it is necessary to guide the user how to express, a statement for guiding the expression is put ahead, and the clarifying speech is put at the sentence end as an ending;

| Suggested |
|---|
| A: What time to remind you? Q: [Unclear expression] A: You may say "six o'clock tomorrow morning". Please tell me what time to remind you? |

2.2.2 Simple sentences must be used and should be smooth and easy to understand;

2.2.2.1 The sentence structure is simple and smooth without any inverted sentence;

| Suggested | Not suggested |
|---|---|
| A: Which city do you live in? | A: Where is the city in which you live? |

2.2.2.2 In clarifying speeches, words expressing politeness and apology such as "could you please" and "I'm sorry" may be omitted directly, to shorten the sentences for direct communication. The structure of the clarifying speeches is made either a "direct question", or "feedback to the user"+"a direct question".

| Suggested | Not suggested |
|---|---|
| Q: set the alarm clock A: What time to remind you? | Q: set the alarm clock A: Could you please tell me what time to remind you? |

2.2.3 The speeches are not verbose and are natural and concise.

2.2.3.1 The sentence length is proper. The sentence length is optimal if the sentence can be spoken without any break at a normal speaking speed, to ensure that the user can understand the content of the whole sentence before his/her attention is distracted

| Suggested | Not suggested |
|---|---|
| Q: set the alarm clock at 8 o'clock<br>A: tonight or tomorrow morning | Q: set the alarm clock at 8 o'clock<br>A: Could you please tell me whether you mean 8 o'clock tonight or 8 o'clock tomorrow morning? |

2.2.3.2 Use a referent properly, content already known by the user should be omitted from the sentence as much as possible, sentence integrity is not pursued upon clarification, and accuracy and simplicity are more important than completeness of the sentence structure. It needs to be noted that the referent may be directed to the question for the user, or directed to the sentence presently replied by the user or the aforementioned content, but the referent cannot be directed to the reply in a preceding round or the content expressed by the user in a preceding round;

| Suggested |
|---|
| Q: set the alarm clock at 8 o'clock<br>A: tonight or tomorrow morning |

2.2.3.3 Use less onomatopoeia or avoid using onomatopoeia as much as possible, to keep the tone calm.

2.3 Principles of satisfying speeches

Definition

The user's demand is directly satisfied through the dialog. The content for answering the user's question is called "satisfaction" of the dialog.

Q: one plus one equals what?
A: one plus one equals two Special principles of the satisfying speeches are described below.

Special principles 2.3.1 The satisfying speeches use a declarative sentence, with a definite reply.

2.3.1.1 Try to use the declarative sentence to express, not set a question in the answer, and regard the current answer as the ending of this passage of dialog.

2.3.1.2 Regarding precise demand, when the user's information demand is satisfied, it is necessary to repeat the user's demand and clarify conditions.

2.3.1.3 As for satisfaction of a general recommendation, try to tell the user the current satisfying content information.

| Suggested | Not suggested |
|---|---|
| Q: What about Beijing's weather today<br>A: Beijing's weather today . . . | Q: play Jay Chou's Qinghuaci<br>A: Jay Chou, Qinghuaci [play the song later] |

2.3.2 Sentences are simple, smooth and easy to understand.

2.3.2.1 The sentence structure is simple without inverted sentences and too many subordinate clauses, without piling up adjectives, and uses logically clear ordinary statements.

2.3.2.2 The sentence is structured to have a strong readability, refrain from occurrence of listing of a lot of parallel words, try to classify words in clusters, simulate colloquial expressions, and grasp the user's attention.

| Suggested | Not suggested |
|---|---|
| A: Ingredients for cooking scrambled egg with tomato are mainly tomato, egg and scallion, and additionally edible oil, sugar and salt | A: Ingredients for cooking scrambled egg with tomato include tomato, egg, scallion, edible oil, sugar and salt |

2.3.3 Control-type satisfaction is concise and definite.

2.3.3.1 Regarding satisfaction with a possibly large feedback delay, since the user is waiting, it is impossible to determine whether the user's demand is understood. Hence, it is necessary to feed back "ok", and then complete the subsequent task.

| Suggested |
|---|
| Q: turn on the light<br>A: ok |

2.3.3.2 Regarding satisfaction substantially without delay, since the user can definitely know whether the operation is executed through an audible feedback of a satisfaction result, a special response speech may not be provided.

| Suggested |
|---|
| [scenario: music being played]<br>Q: next song<br>A: [provide no response, and directly play next song] |

2.3.3.3: Regarding control-type demands without definite feedback, it is necessary to inform the user of a state after completion of the operation.

| Suggested | Suggested |
|---|---|
| [scenario: music being played]<br>Q: save<br>A: already saved [already complete the operation of saving] | [scenario: music being played]<br>Q: single cycle<br>A: start single cycle [already complete the operation of playing the single song cyclically] |

In the depictions of the description, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Furthermore, the described specific features, structures, materials, or characteristics may be combined in any suitable manner in one or more embodiments or examples. In addition, in the case of no mutual contradiction, those skilled in the art may incorporate or combine different embodiments or examples and features of different embodiments or examples described in the description.

In addition, terms "first" and "second" are only used for illustration purpose and cannot be understood as indicating or implying relative importance or implicitly indicating the number of the meant technical features. Hence, a feature defined by "first" and "second" may explicitly or implicitly indicate that at least one said feature is included. In the depictions of the present disclosure, "a plurality of" means two or more, unless otherwise definitely and specifically defined.

Any procedure or method described in the flow charts or otherwise described herein may be understood to represent a module, segment or portion of code that includes one or more instructions for implementing the steps of a particular logical function or process. Moreover, the scope of preferred embodiments of the present disclosure includes other implementations, which may not be in the order shown or discussed, including executing functions in a substantially simultaneous manner or in an opposite order according to the related functions. This should be understood by those skilled in the art which embodiments of the present disclosure belong to.

The logic and/or step shown in the flow chart or otherwise described herein, for example, can be thought of as an ordered list of instructions used to implement logic functions, may be specifically implemented in any computer readable medium for use by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adapted for including, storing, communicating, propagating or transferring programs for use by or in combination with the instruction execution system, device or equipment.

In embodiments of the present disclosure, the computer readable medium may be a computer readable signal medium or a computer readable storage medium or any combination of the two. More specific examples (non-exhaustive list) of the computer readable storage medium at least includes: an electronic connection (an electronic device) with one or more wires, a portable computer disc box (a magnetic device), a random access memory (RAM), a read only memory (ROM), an erasable programmable read-only memory (EPROM or a flash memory), an optical fiber device and a portable compact disk read-only memory (CDROM). In addition, the computer readable storage medium may even be a paper or other appropriate medium on which the program can be printed, this is because, for example, the paper or other appropriate medium may be optically scanned and then edited, decrypted or processed in other appropriate manners when necessary to obtain the programs in an electric manner, and then the program may be stored in the computer memory.

In embodiments of the present disclosure, the computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium other than the computer-readable storage medium, and the computer-readable medium may send, propagate or transmit a program for use by an instruction execution system, input method or device or a combination thereof. The program codes included by the computer-readable medium may be transmitted with any suitable medium, including, but not limited to radio, electric wire, optical cable, radio frequency (RF) or the like, or any suitable combination thereof.

It should be appreciated that each part of the present disclosure may be realized by the hardware, software, firmware or their combinations. In the above embodiments, a plurality of steps or methods may be realized by the software or firmware stored in the memory and executed by the appropriate instruction execution system. For example, if it is realized by the hardware, likewise in another embodiment, it may be realized by one or a combination of the following techniques known in the art: a discrete logic circuit having a logic gate circuit for realizing a logic function for a data signal, an application-specific integrated circuit having an appropriate combination logic gate circuit, a programmable gate array (PGA), a field programmable gate array (FPGA), etc.

It should be understood by those skilled in the art that all or part of the steps in the method of the above embodiments can be implemented by instructing related hardware via programs, the program may be stored in a computer readable storage medium, and the program includes one step or a combination of the steps of the method when the program is executed.

In addition, function units of the embodiments of the present disclosure may be integrated in a processing module, or these units may be separate physical existence, or two or more units are integrated in a module. The integrated module may be realized in a form of hardware or in a form of a software function module. When the integrated module is realized in a form of the software function module and is sold or used as a standalone product, the integrated module may be stored in a computer readable storage medium. The storage medium stated here may be a read only memory, a magnetic disk, an optical disk or the like.

What are described above are only specific implementation modes of the present disclosure, but the extent of protection of the present disclosure is not limited to this. Without departing from the technical scope revealed by the present disclosure, those skilled in the art can readily envisage various variations or substitutes, which are all covered by the extent of protection of the present disclosure. Hence, the extent of protection of the present disclosure should be subject to the protection scope of the appended claims.

What is claimed is:

1. A voice interaction method, the method comprising the following steps:
    obtaining a demand of a user according to a voice of the user;
    determining a pre-stored task template matched with the demand of the user;
    matching the demand of the user with a necessary slot in the matched task template; and
    in a case that the demand of the user lacks content of the necessary slot, executing a step of obtaining the content of the necessary slot, to obtain the content of the necessary slot, wherein the obtained content of the necessary slot comprises content of a first-class necessary slot, and the content of the first-class necessary slot is content of the necessary slot that must be provided by the user;
    wherein the task template is a template generated in advance according to information required for activating a task operation through voice, the slot is information in the task template, and the necessary slot is necessary information in the task template for activating the task operation, and
    wherein the step of obtaining the content of the necessary slot comprises:
    executing a step of clarifying the content of the first-class necessary slot, including the following steps:
    generating interaction data for clarifying the content of the first-class necessary slot according to a preset clarification rule, and providing the interaction data to the user; and
    obtaining an input of the user, to determine the content of the first-class necessary slot according to the input of the user;
    during execution of the step of clarifying the content of the first-class necessary slot, in a case that the content of the first-class necessary slot has already been clarified, and a further demand of the user is to query for an already-clarified content, which has been clarified by the user via the interaction data, of the first-class necessary slot, informing the user of the already-clarified content of the first-class necessary slot, queried by the user.

2. The method according to claim 1, wherein in a case that the demand of the user lacks content of a plurality of first-class necessary slots, executing the step of clarifying the content of a first-class necessary slot with respect to each of first-class necessary slots in which content is absent, in a preset order.

3. The method according to claim 1, wherein the step of obtaining the content of the necessary slot comprises the following step:
in a case that the demand of the user lacks content of a second-class necessary slot, acquiring the content of the second-class necessary slot locally from a user-used terminal;
wherein the content of the second-class necessary slot is content of the necessary slot that is locally acquirable from the user-used terminal.

4. The method according to claim 3, wherein in a case that the step of acquiring the content of the second-class necessary slot locally from the user-used terminal fails, the method further comprises the following steps:
generating interaction data for clarifying the content of the second-class necessary slot according to a preset clarification rule, and providing the interaction data to the user; and
obtaining the voice of the user, to determine the content of the second-class necessary slot according to the voice of the user.

5. The method according to claim 3, wherein the method further comprises the following steps:
in a case that the demand of the user includes content of all necessary slots, executing the task operation corresponding to the task template;
during activation of the task operation or within a preset time period after completion of the activation of the task operation, in a case that the demand of the user is to modify content of any one of the second-class necessary slots, activating the task operation corresponding to the task template after modification;
wherein each task template corresponds to one task operation.

6. The method according to claim 1, wherein the method further comprises the following step:
in a case that the demand of the user includes content of all necessary slots, activating the task operation corresponding to the task template;
wherein each task template corresponds to one task operation.

7. The method according to claim 6, wherein the method further comprises the following step:
within a preset time period after completion of activation of the task operation, in a case that the demand of the user is to change the task operation, the method further comprises the following step:
confirming the changing operation with the user, and changing the task operation after the user confirms.

8. A non-transitory computer readable storage medium in which a computer program is stored, wherein the computer program, when executed by a processor, implements the method according to claim 1.

9. A voice interaction apparatus, the apparatus comprising:
one or more processors, and
a storage device for storing one or more programs and task templates,
the one or more programs, when executed by said one or more processors, enable said one or more processors to:
obtain a demand of a user according to a voice of the user;
determine a task template matched with the demand of the user, and match the demand of the user with a necessary slot in the matched task template; and
obtain the content of the necessary slot in a case that the demand of the user lacks content of the necessary slot, wherein the obtained content of the necessary slot comprises the content of a first-class necessary slot, and the content of the first-class necessary slot is content of the necessary slot that must be provided by the user;
wherein the task template is a template generated in advance according to information required for activating a task operation through voice, the slot is information in the task template, and the necessary slot is necessary information in the task template for activating the task operation, and
wherein the one or more programs, when executed by said one or more processors, further enable said one or more processors to clarify the content of the first-class necessary slot as follow:
generating interaction data for clarifying the content of the first-class necessary slot according to a preset clarification rule, and providing the interaction data to the user; and
obtaining an input of the user, to determine the content of the first-class necessary slot according to the input of the user;
during clarifying the content of the first-class necessary slot,
in a case that the content of the first-class necessary slot has already been clarified, and a further demand of the user is to query for an already-clarified content, which has been clarified by the user via the interaction data, of the first-class necessary slot, informing the user of the already-clarified content of the first-class necessary slot, queried by the user.

10. The apparatus according to claim 9, wherein the one or more programs, when executed by said one or more processors, enable said one or more processors further to, in a case that the demand of the user lacks content of a plurality of first-class necessary slots, clarify the content of a first-class necessary slot with respect to each of the first-class necessary slots in which content is absent, in a preset order.

11. The apparatus according to claim 9, wherein the one or more programs, when executed by said one or more processors, enable said one or more processors further to, in a case that the demand of the user lacks content of a second-class necessary slot, acquire the content of the second-class necessary slot locally from a user-used terminal;
wherein the content of the second-class necessary slot is content of the necessary slot that is locally acquirable from the user-used terminal.

12. The apparatus according to claim 11, wherein the one or more programs, when executed by said one or more processors, enable said one or more processors further to, in a case that the acquiring the content of the second-class necessary slot locally from the user-used terminal fails, execute the following steps:

generating interaction data for clarifying the content of the second-class necessary slot according to a preset clarification rule, and providing the interaction data to the user; and obtaining the voice of the user, to determine the content of the second-class necessary slot according to the voice of the user.

* * * * *